(12) United States Patent
Schiavello et al.

(10) Patent No.: US 10,206,500 B2
(45) Date of Patent: Feb. 19, 2019

(54) RECONFIGURABLE WORKSTATION SUPPORT

(71) Applicant: Schiavello (Vic) Pty Ltd, Tullamarine, Victoria (AU)

(72) Inventors: Peter Paul Schiavello, Tullamarine (AU); Peter Geyer, East Melbourne (AU); Oliver Martyn Field, Tullamarine (AU); Joseph Franco, Tullamarine (AU)

(73) Assignee: Schiavello (Vic) Pty Ltd, Tullamarine (AU)

( * ) Notice: Subject to any disclaimer, the term of this patent is extended or adjusted under 35 U.S.C. 154(b) by 0 days.

(21) Appl. No.: 15/056,887

(22) Filed: Feb. 29, 2016

(65) Prior Publication Data

US 2016/0374464 A1   Dec. 29, 2016

Related U.S. Application Data

(62) Division of application No. 13/381,337, filed as application No. PCT/AU2010/000809 on Jun. 28, 2010, now Pat. No. 9,271,568.

(51) Int. Cl.
*F16L 3/00* (2006.01)
*A47B 21/06* (2006.01)
(Continued)

(52) U.S. Cl.
CPC .............. *A47B 21/06* (2013.01); *F16G 13/16* (2013.01); *F16L 3/015* (2013.01);
(Continued)

(58) Field of Classification Search
CPC .......... H02G 3/32; H02G 3/0608; H02G 3/30; H02G 3/26; H02G 3/263
(Continued)

(56) References Cited

U.S. PATENT DOCUMENTS

| 4,224,769 A | 9/1980 | Ball et al. |
| 4,392,344 A | 7/1983 | Gordon et al. |

(Continued)

FOREIGN PATENT DOCUMENTS

| CA | 2 115 787 C | 4/1995 |
| CA | 2 340 580 A1 | 9/2001 |

(Continued)

OTHER PUBLICATIONS

Communication dated Apr. 8, 2014, issued in corresponding European Patent Application No. 10 793 416.8, filed Jun. 28, 2010, 5 pages. (Note that sheet 2 of the remarks incorrectly identifies JP 2007135323A as "JP200713532A.").

(Continued)

*Primary Examiner* — Steven M Marsh
(74) *Attorney, Agent, or Firm* — Christensen O'Connor Johnson Kindness, PLLC; Ryan E. Dodge, Jr.

(57) ABSTRACT

A workstation services support structure including a beam supported at or near desk height on one or more legs is described. The beam includes one or more elongate mounting means extending substantially along its length. Each elongate mounting means corresponds to a zone (Zones 1 to 4) in which one or more accessories to support a workstation service can be movably mounted with respect of the beam to enable service delivery at a user selectable position within the zone. The support structure includes a plurality of zones (Zones 1 to 4) that can be defined to be non-overlapping such that an accessory mounted within one zone does not interfere with an accessory mounted within another zone. Legs, accessories and couplings and systems incorporating such elements are also described.

16 Claims, 14 Drawing Sheets

(51) Int. Cl.
*F16G 13/16* (2006.01)
*F16L 3/015* (2006.01)

(52) U.S. Cl.
CPC . *A47B 2021/066* (2013.01); *A47B 2200/0029* (2013.01); *A47B 2200/0066* (2013.01)

(58) Field of Classification Search
USPC .......... 248/65, 68.1, 73; 108/50.02; 52/36.1
See application file for complete search history.

(56) References Cited

U.S. PATENT DOCUMENTS

| | | | |
|---|---|---|---|
| 4,658,577 A | | 4/1987 | Klein |
| 4,672,805 A | | 6/1987 | Moritz |
| 5,240,209 A | | 8/1993 | Kutsch |
| 5,271,585 A | * | 12/1993 | Zetena, Jr. .......... G02B 6/4459 174/95 |
| 5,394,658 A | | 3/1995 | Schreiner et al. |
| 5,606,919 A | | 3/1997 | Fox et al. |
| 5,642,612 A | | 7/1997 | Hughes |
| 5,836,148 A | | 11/1998 | Fukao |
| 6,406,212 B1 | * | 6/2002 | Meyer .................. H02G 3/0456 248/58 |
| 6,448,498 B1 | | 9/2002 | King et al. |
| 6,497,184 B1 | | 12/2002 | Whitesitt |
| 6,708,480 B1 | | 3/2004 | Wehler |
| 6,941,974 B2 | | 9/2005 | Utaki |
| 7,357,086 B2 | * | 4/2008 | Petrick .................. A47B 21/00 108/50.02 |
| 9,433,282 B2 | * | 9/2016 | Steelman ................ F16B 12/44 |
| 9,508,472 B2 | * | 11/2016 | Deshaies .................. H02G 3/30 |
| 2006/0278777 A1 | * | 12/2006 | Atkinson ............. A47B 13/021 248/188.4 |
| 2008/0251291 A1 | | 10/2008 | Kadrnoska et al. |
| 2008/0265112 A1 | * | 10/2008 | Pascual .................. H02G 3/32 248/176.1 |

FOREIGN PATENT DOCUMENTS

| | | |
|---|---|---|
| CH | 681585 A5 | 4/1993 |
| DE | 196 10 347 C1 | 4/1997 |
| EP | 0 027 001 A2 | 4/1981 |
| EP | 0 161 532 A2 | 11/1985 |
| JP | 9-289923 A | 11/1997 |
| JP | 11-289631 A | 10/1999 |
| JP | 2004-140998 A | 5/2004 |
| JP | 2007135323 A | 5/2007 |
| WO | 2004/054045 A1 | 6/2004 |

OTHER PUBLICATIONS

Extended European Search Report dated Oct. 1, 2012, issued in corresponding European Patent Application No. 10 793 416.8, filed Jun. 28, 2010, 6 pages.

International Search Report and Written Opinion of the International Searching Authority, dated Aug. 23, 2010, issued in corresponding International Application No. PCT/AU2010/000809, filed Jun. 28, 2010, 11 pages.

* cited by examiner

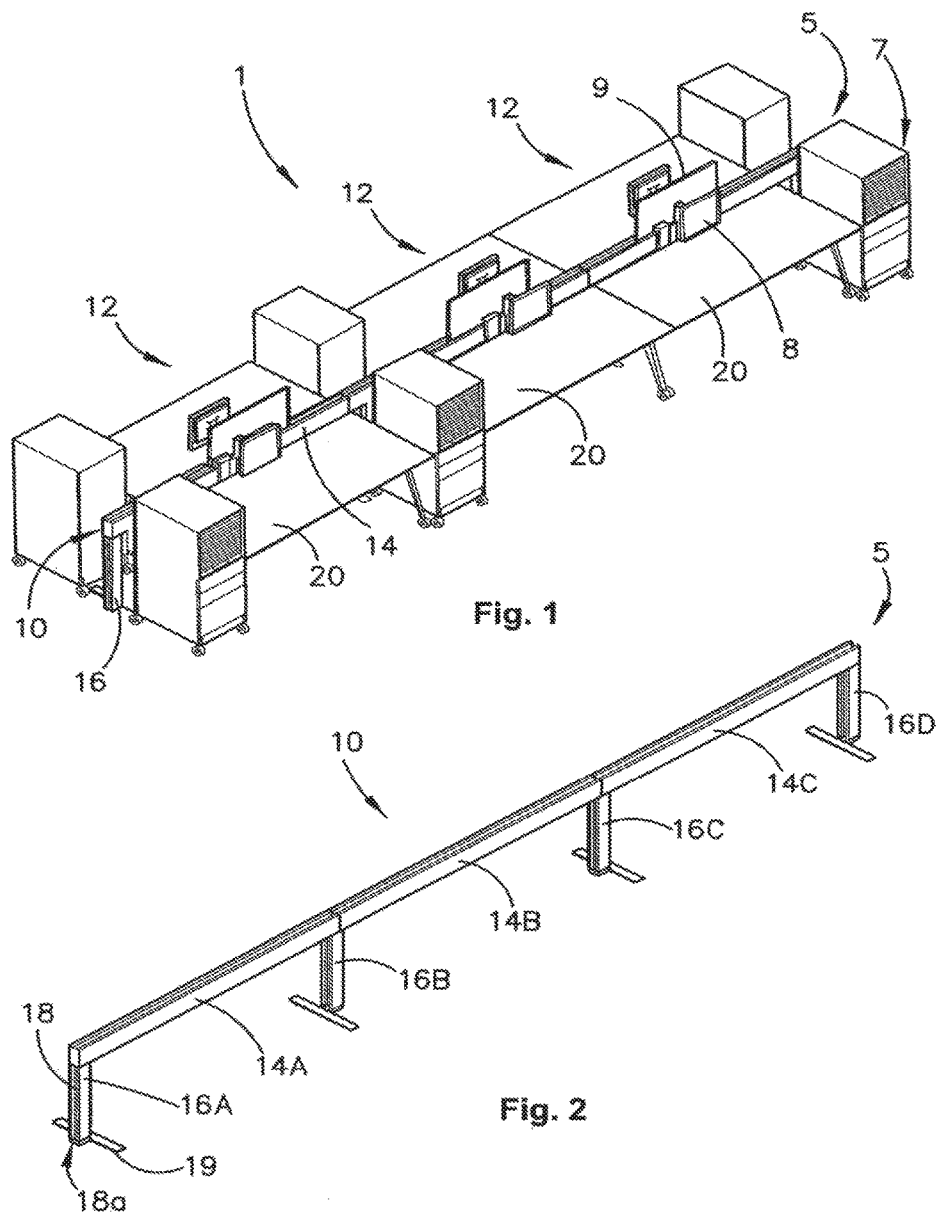

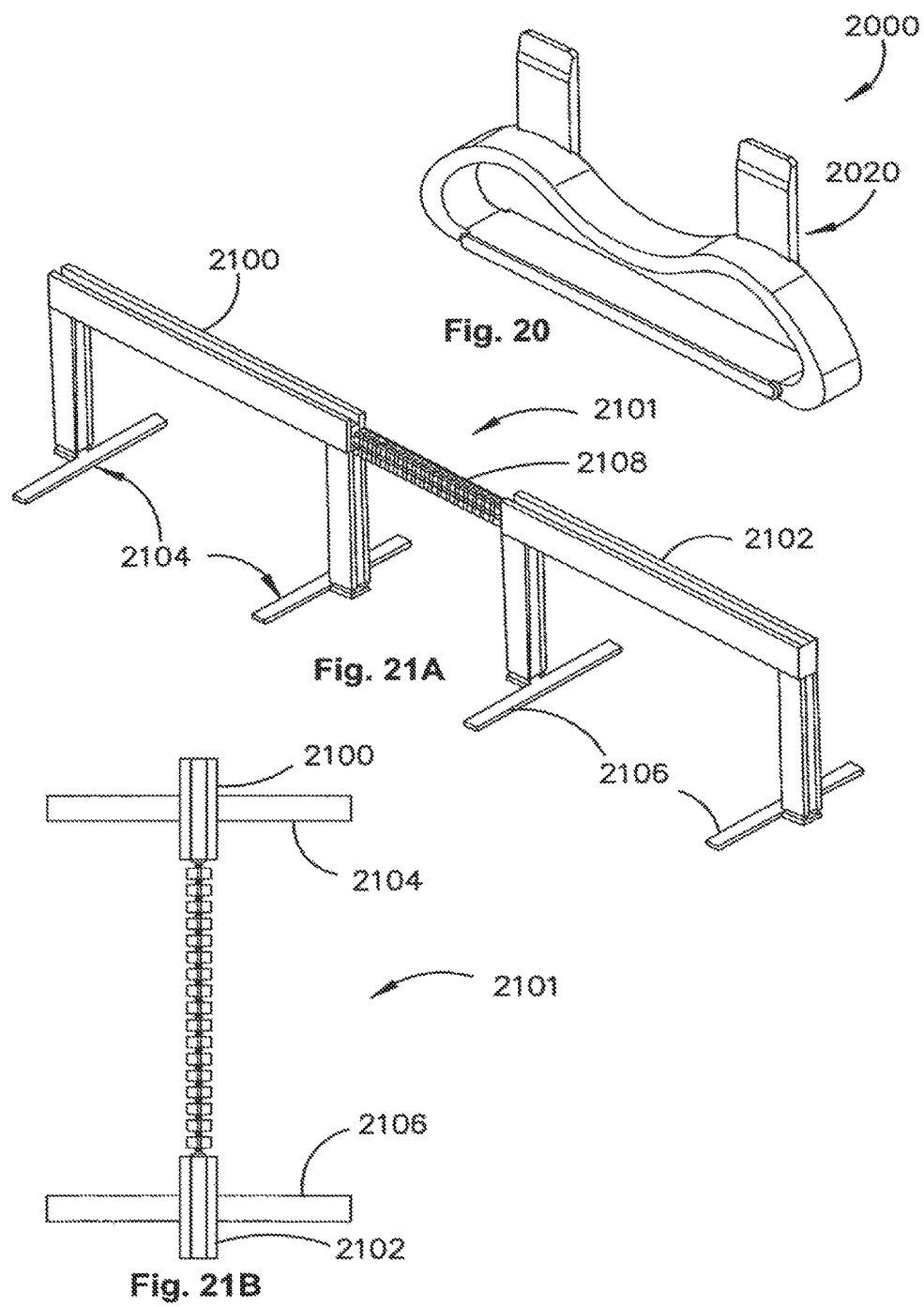

though they need not be. Preferably the channels include several different geometries e.g., side-by-side channels at one portion of the beam and upper/lower channels at another portion.

RECONFIGURABLE WORKSTATION SUPPORT

CROSS-REFERENCES TO RELATED APPLICATIONS

This application is a division of U.S. application Ser. No. 13/381,337, filed Dec. 28, 2011, which is the National Stage of International Application No. PCT/AU2010/00809, filed Jun. 28, 2010, both of which applications are incorporated herein by reference in their entirety.

FIELD OF THE INVENTION

The present invention relates to developments associated with reconfigurable work stations. In one form, the invention relates to a workstation services support structure. In another form, the invention includes a workstation support structure with an improved cable management system. These embodiments may find particular application in an office environment, particularly open plan office designs, but the invention should not be considered as being limited to such uses.

BACKGROUND

There has been a rapid move towards open plan office spaces for many industries, including those that have typically been office based. With open plan spaces there is a need for the work stations to be reconfigurable to allow flexibility in the use of the space, but to remain aesthetically pleasing. Work stations should accommodate individual worker's requirements, for example, by allowing variability of desk height, lighting position and type, storage location, computer monitor location and the existence or absence of privacy screens. Vertical storage may be used to minimise the footprint of an individual work station in an open plan space. However, such improvements may result in complex mounting arrangements.

Cable management at work stations has become complicated with the use of portable computers, telephone systems including mobile phones and personal digital assistants (PDAs). Such problems may be compounded as employees move or an individual's requirements change.

Current cubicle-style work stations generally include a partition into which channels are built. The channels house the cables for a work station. The partition may partially support a desk. The cables project out from the partition under the desk, or alternatively power and data points are built into the partition. The location of power points and data cable connection points is typically fixed to a specific location on the partition. Long connection cables must be used to enable flexibility in desk arrangement of electrical devices. External power boards or double adapters are required if there are extra power requirements for a particular work station beyond the fixed number of supplied points.

In conventional office fit-outs using conventional workstations it is common for all of the workstations to be essentially the same. This uniformity of the workstations can lead to wasted materials and resources. For example, conventional cubical arrangements will typically provide a screen from floor height up to eye height all round a work station even if the worker does not require or desire such a high level of screening. The lack of flexibility in the layout and set-up of conventional workstation systems can mean that resources and materials are wasted in providing structures that are not needed by workers.

It is therefore an object of the present invention to provide a reconfigurable work station with an improved cable management system that provides flexibility, particularly in terms of cable management and access to power and/or data points.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In a first aspect the present invention provides a workstation services support structure including a beam supported at or near desk height on one or more legs, the beam including one or more elongate mounting means extending substantially along its length, each elongate mounting means corresponding to a zone in which one or more accessories to support a workstation service can be movably mounted with respect of the beam to enable service delivery at a user selectable position within the zone.

Preferably the support structure includes a plurality of zones defined to be non-overlapping such that an accessory mounted within one zone does not interfere with an accessory mounted within another zone.

Preferably the elongate mounting means is selected from a list including but not limited to:
one or more channels: one or more flanges one or more slots one or more grooves, one or more series of holes, one or more series of pins one or more rails In one form the beam can include one or more of the following zones:
an top zone adapted for the mounting of accessories upwardly extending from the beam; an bottom zone adapted for the mounting of accessories descending downward from the top of the bottom zone; at least one side-facing zone adapted for the mounting of accessories on associated with the sides of the beam.

Preferably the beam includes a plurality of routing paths to internally route power and/or data cables. The routing paths can be defined by providing at least one routing channel through the beam. In a particularly preferred form there is provided an upper and lower cable routing channel, although other embodiments might use other geometries e.g., side by side or co-axial channels. In this preferred form the upper cable routing channel is preferably accessible via at least its upper side, and the lower cable routing channel is acceptable via at least its underside.

The routing paths can form part of an elongate mounting means associated with a zone, e.g., can be a part of a channel associated with a zone.

In a particularly preferred form the upper and lower channels are separated by a wall or walls that include at least one pathway between them to allow routing of cables in one channel through the other channel. Preferably the channels are provided with several pathways between them along their length.

In a particularly preferred form the system is adapted such that cables are intended to be routed out of the beam via at least one opening provided on one side of the beam. The opening(s) can be provided in the bottom of the beam.

In this case cables routed via the upper channel can be routed through a pathway between the channels toward the opening to exit the beam.

In another aspect the present invention relates to a workstation services system including a workstation services support structure and at least one accessory for delivering a service to the workstation associated with the system and configured to be mounted on the beam. Another aspect also provides a workstation including a worktop and an associated workstation services system.

According to a second aspect, the present invention provides a cable management system for a reconfigurable work station. The system includes at least one self-supporting elongate beam having at least one leg to support the beam at or near desk height, the beam being capable of internally routing power and/or data cables in a manner which allows at least one cable to be routed out of the beam at a plurality of positions along the length of the beam. The beam also includes at least one exterior mounting channel for slidably receiving one or more interchangeable accessories, including at least one power and/or data board connected to respective data and/or power cables routed through the beam.

Preferably the beam includes a plurality of routing paths to internally route power and/or data cables. The routing paths can be defined by providing at least one routing channel through the beam. In a particularly preferred form there is provided an upper and lower cable routing channel, although other embodiments might use other geometries e.g., side by side or co-axial channels. In this preferred form the upper cable routing channel is preferably accessible via at least its upper side, and the lower cable routing channel is acceptable via at least its under side.

In a particularly preferred form the upper and lower channels are separated by a wall or walls that include at least one pathway between them to allow routing of cables in one channel through the other channel. Preferably the channels are provided with several pathways between them along their length.

In a particularly preferred form the system is adapted such that cables are intended to be routed out of the beam via at least one opening provided on one side of the beam. The opening(s) can be provided in the bottom of the beam.

n this case cables routed via the upper channel can be routed through a pathway between the channels toward the opening to exit the beam.

Preferably the beam is formed of a plurality of beam sections coupled to each other by coupling means. The coupling means can include linear coupling means adapted to couple adjacent beam sections in a linear relationship. The coupling means can include angled coupling means adapted to enable couple adjacent beam segments in a non-linear geometry. In a preferred form the coupling means can enable the relative angle formed between adjacent beam sections to be changed. The coupling means can form part of a leg assembly on which the beam is supported. The coupling means can be an articulated connector as described herein. Such an articulated connector can advantageously be used if a flexible or non-linear arrangement is desired.

In some forms the coupling means can couple more than two beam segments, to form a branched beam arrangement.

Preferably the legs supporting the beam are capable of internally routing power and/or data cables to the beam. In this regard, the legs can include a plurality of routing paths through the leg.

In a particularly preferred form the beam is substantially non-screening. Screening can be provided by one or more screens mounted to the top the beam. In one form a beam is provided with a channel adapted to receive a screen gripping means. The screen gripping means is preferably a resilient member configured to grip a lower portion of a screen. In one embodiment the screen is mountable in an upper portion of a cable routing channel.

In a third aspect the present invention provides a furniture leg including a load bearing upright member and a foot, said foot for contacting the ground in use and extending outward from the upright member so as to provide support of the furniture against tipping about at least a first axis, wherein the foot is configured so that in use a leg of an adjacent item of furniture can be substantially aligned with and the upright member without interference from the foot.

Preferably the foot is coupled to the upright member in such a way that it is at least partially offset from the upright member in a direction parallel to the first axis.

Preferably the leg is substantially shaped as an inverted "T".

In a fourth aspect the present invention provides a furniture leg adapted to support one or more furniture items in a reconfigurable manner, the leg including: at least one foot portion at the bottom of the leg to contact the ground, at least one furniture support member rotatable relative to the foot and configured to be coupled to furniture to be supported; load bearing support means extending between the foot and said at least one support member; a plurality of cable retention members defining at least one cable channel within the leg.

Preferably cable retention members are rotatable with respect to at least one of the, foot, the support means and furniture support. The support means can include a central support column, on which the cable retention members can be mounted.

In a preferred form the cable retention members include at least one pair of resilient cable retaining arm defining a cable retention channel, to releasably retain a cable. A plurality of cable retention arms can be used.

In another form a plurality of cable retention members are mounted along the length of the support column to define at least one reconfigurable cable retention channel. Most preferably a plurality of cable retention channels can be defined by arranging the cable retention members.

A leg according to the above aspects can include a cable access port to enable entry of cables into the cable channel. The cable access port can be located on an underside of the leg to enable access to a cable channel from below.

In a further aspect there is provided a reconfigurable workstation including:

a core comprising at least one beam supported on one or more legs at or about the height of a worktop associated with the workstation, one or more data and or electrical outlets repositionably mounted along the core and connected to a corresponding power and or data cable, wherein the core includes a cable retention means to retain a length of said one or more data and/or power cables within the core, and cable routing means to enable a bight of cable to extend from the cable retention means to its respective power or data outlet to permit repositioning of the data and/or electrical outlets along the core.

In one aspect there is provided a services support structure including at least two self supporting beam segments coupled to each other by an articulated connector, said beam segments including at least one cable reticulation channel and said articulated connector including at least one corresponding cable reticulation channel provided to bridge a gap between corresponding cable reticulation channels of the coupled beam segments.

Preferably, the articulated connector is bendable in one plane only. Most preferably the services support structure provides a horizontally supported beam and the articulated connector is bendable in the horizontal plane.

Preferably the beam segments are part of a workstation support structure as described herein.

In one aspect the present invention provides an articulated connector configured to join a pair of cable reticulation beams; the articulated connection including a multiplicity of cable retaining segments including at least one channel segment adapted to receive a cable therein; said cable retaining segments being connected to an adjacent cable retaining segment to allow pivoting movement between them.

Preferably the cable retaining segments include a structure for defining a plurality of separate channel segments therein. Each end of the articulated connector can include a beam engaging means to couple the connector to each beam.

At least neighbouring cable retaining segments can be coupled by flexible members that are relatively bendable in one direction but relatively stiff in another. Said resilient members are preferably flexible strips.

Most preferably the articulated connector is flexible in a first direction (typically horizontal in use) but self supporting in a second direction (typically vertical in use) such that it is capable of supporting at least one electrical and/or data cables without drooping in the second direction. The connector can preferably be bent in a direction perpendicular to the first direction.

The articulated connector is preferably adapted to allow formation of a curved connection between neighbouring beam segments. Most preferably the articulator allows a centre of curvature of the connector to be varied. The curve approximated by the connection between neighbouring beam segments can have a centre or axis of curvature that lies outside an envelope of the connected beam segments.

The connector can allow multiple curved segments along its length e.g., a curve in a first direction and a second direction to form an S shape, loop, or serpentine shape etc. Thus multiple centers of curvature can be defined. The connector can allow a curve with a non-constant curvature along its length e.g., a parabolic curve, logarithmic curve, irregular curve etc.

In another aspect there is provided a repositionable beam mountable accessory for a workstation, the accessory including a mounting arrangement configured to engage an elongate mounting means of a workstation support beam, said mounting arrangement being adapted such that the accessory can be repositioned along the workstation support beam substantially without deleterious effect on the accessory.

For example, the beam mountable accessory can preferably be repositioned without needing to be mechanically disengaged or fastened to the beam using a mechanical fastener that will damage either the beam or accessory—such as a self-tapping screw, rivet or the like. A mechanical stop means can be provided to prevent unwanted sliding of the accessory in use, but preferably this will only engage the beam and/or accessory in a manner that does no damage to the beam and/or accessory, and more preferably the stop means is releasable without use of tools.

Preferably the mounting arrangement includes an upper beam engaging portion that includes a downwardly hooked arrangement for downwardly engaging a receiving recess in the elongate mounting means of the workstation to retain accessory on the beam.

Preferably the mounting arrangement includes a second beam engaging portion that is used to apply a biasing force to the hooked arrangement such that when accessory is mounted to the beam it is biased towards an engaged condition with the mounting means.

The mounting arrangement can include a lower beam engaging portion to engage the beam. The second beam engaging portion can be a biasing member associated with the lower beam engaging portion that is adapted to engage the beam bias the upper beam engaging portion into an engaged condition against the beam.

A biasing means could form part of the beam and engage with the second beam engaging portion to thereby transmit a biasing force to the hooked arrangement through the accessory.

The accessory can be, but it not limited to, any one of the following accessories:

a power outlet, a power board, a data point, data point board, shelf, a light, mounting arm, mounting bracket, a tray.

Without limitation, combinations of a work station support system including a beam described herein and one or more accessories as described above constitute additional aspects of the present invention.

As used herein, except where the context requires otherwise, the term "comprise" and variations of the term, such as "comprising", "comprises" and "comprised", are not intended to exclude further additives, components, integers or steps.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a perspective view of a cable management system incorporated into a reconfigurable work station according to the present invention;

FIG. 2 is a perspective view of a core of a cable management system according to a first embodiment of the present invention;

FIG. 20 illustrates a biasing spring for holding an accessory on the support beam.

FIG. 21A illustrates a first exemplary configuration of two beam segments coupled by an articulated coupling.

FIG. 21B illustrates the articulated coupling of FIG. 21A in more detail.

DETAILED DESCRIPTION

Figure 3:
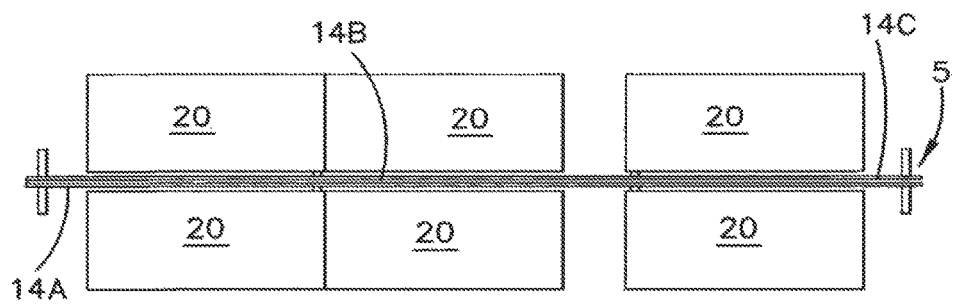
FIGS. 3, 4 and 5 are top views of work stations including cable management systems according to the present invention showing three different configurations.

FIG. 1 shows six individual work stations set up using an embodiment of the present invention. This overview figure illustrates one way in which an embodiment of the present invention may be configured. The work station arrangement 1 is formed from a core 5 which is formed from a central beam 14 mounted on legs 16. The core 5 contains a cable management system 10, and is mounted at or about desk height. The core 5 has the basic functions of providing a support structure for workstation accessories and services and to provide cable management via hidden cable reticulation passages with the core 5. In this arrangement 1, six freestanding desks 20 are positioned alongside the core 5. Each desk 20 has an associated pedestal, e.g., 7, and computer monitor, e.g., 8, to form individual work station 12. The pedestals are also freestanding and not attached to the core 5. The monitors are mounted via respective monitor arms to the beam 14 of the core 5. As can be seen, individual work stations 12 are arranged in pairs across the core 5. Between the opposing desks of each pair of workstations is mounted a privacy screen 9. The privacy screens 9 are mounted to the central beam 14 of the beam arrangement in a manner which will be described in greater detail below.

FIG. 2 shows an embodiment of the core 5 without accessories mounted on it or associated equipment. The core beam arrangement 5 comprises three beam segments 14a, 14b and 14c supported on four legs 16a, 16b, 16c and 16d. The legs 16 are generally the shape of an inverted "T" and include an upright 18 and foot 19. The upright 18 includes a channel through which cables may be routed from underfloor cable ports. The foot 19 extends from the leg in a direction perpendicular from the direction of the beam and prevents tipping of the beam. The feet 19 are offset from the uprights 18 in the preferred embodiment. The upright 18 is provided with an entry port 18a to enable entry of cables into the leg's informal cable reticulation channel from floor mounted power and data points. The offset foot allows a freestanding desk with its legs mounted at its corners in a traditional manner to be placed adjacent the beam arrangement 10 such that the edge of the desk aligns accurately with the end of the beam segment 14, with table leg positioned outside the foot 19 of the leg 16. By offsetting the foot along the beam, there is minimal interference between the leg of the adjacent desk and the foot 19 of the leg 16. This enables the desk to be placed with its edge aligned with the end of the core 5, which is aesthetically pleasing. It also allows neighbouring desks to abut each other without gaps between them when two core sections are mounted end to end with linear connectors as described herein. Moreover, it reduces the chance that a passer-by will run into a either a desk edge or corner; or beam end that projects out from the other component.

The adjacent beam segments 14a, 14b, 14c can be mechanically coupled to each other in a variety of ways. This enables reconfigurability of the central beam arrangement 5.

Figure 4:
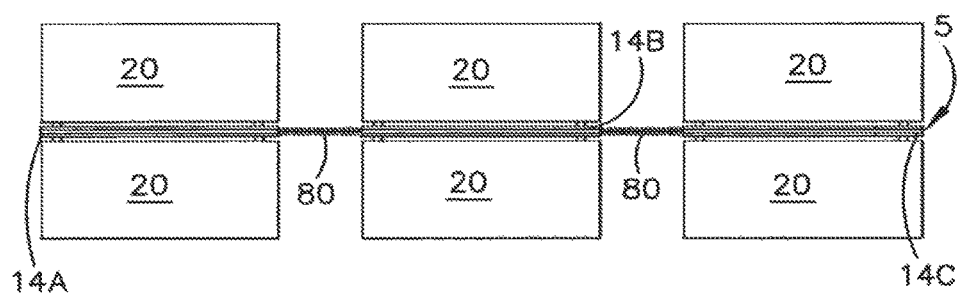
Figure 5:
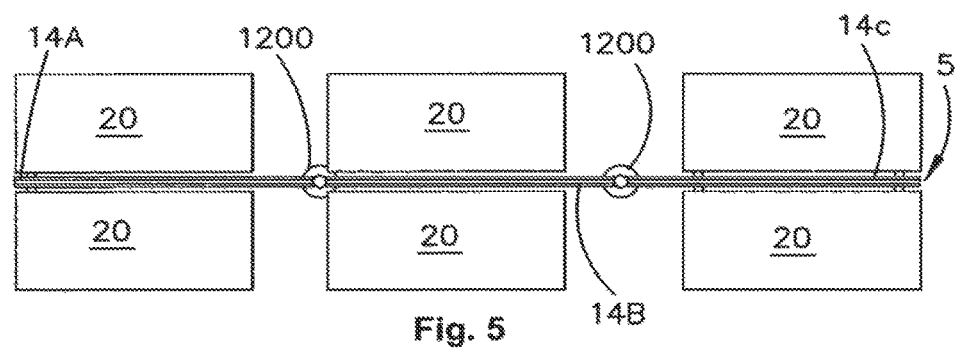

FIGS. 3, 4 and 5 illustrate three embodiments of a core 5 comprised of three beam segments. Each core 5 is shown with six associated desks. In these embodiments the beam segments 14a, 14b, 14c are coupled to neighboring beam segments in different manners. As will be appreciated, in any one embodiment of the present invention a combination of coupling arrangements may be used to tailor the core to a user's requirements.

In FIG. 3, the beam segments 14a, 14b, 14c are rigidly coupled to each other to form a single, linear, rigid beam structure.

FIG. 4 and FIG. 5 illustrate flexible embodiments. In FIG. 4, neighbouring beam segments 14a, 14b, 14c are coupled by an articulated connector which can be termed a "spine", "horizontal umbilical" or "articulator" 80. The articulator 80 provides an articulated connection between neighboring beam segments and may be bent or curved in horizontal a plane to provide a flexible connection between beam segments. The articulator 80 is formed from a plurality of cable retaining segments or 'articulator elements' and which are joined to each other using one or more pins held in place with snap fasteners to provide a hinge-like connection between neighbouring channel segments. The articulator elements are open on their top side and independently mounted on longitudinally extending bendable strips. The articulated connection between neighbouring beams also provides channels to guide and support the cables between neighbouring beam segments 14.

In an arrangement that incorporates an articulator between beam segments or a hub leg as described below, a user can change the shape of the core 5 at any time. In the preferred form the core is made from a relatively light weight material e.g., aluminium which keeps the weight of the beam segment low enough to enable it to be repositioned without using lifting equipment. The use of a flexible coupling and re-positionable accessories assist reconfiguration by limiting and preferably entirely eliminating the need to use tools during reconfiguration.

FIG. 5 illustrates an embodiment of the present invention in which neighbouring beam portions 14 are coupled to each other via a hub leg 1200. The hub leg provides a pivotable connection between 2 or more beam segments and will be described in further detail below.

Figure 6:
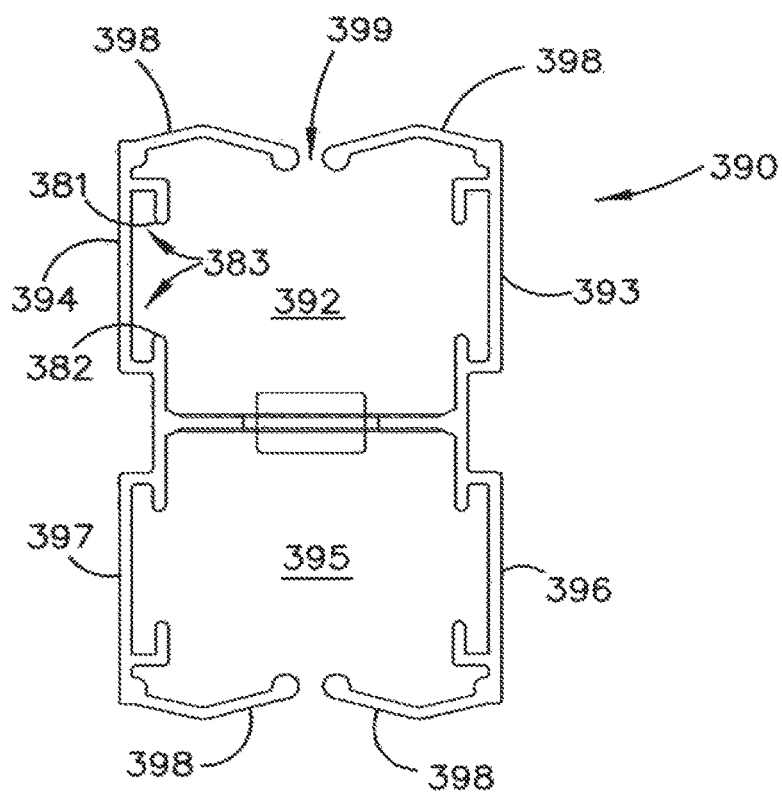
FIGS. 6, 7 and 8 show front, side and top views respectively of an element of an articulated connector used in an embodiment of the present invention.
Figure 7:
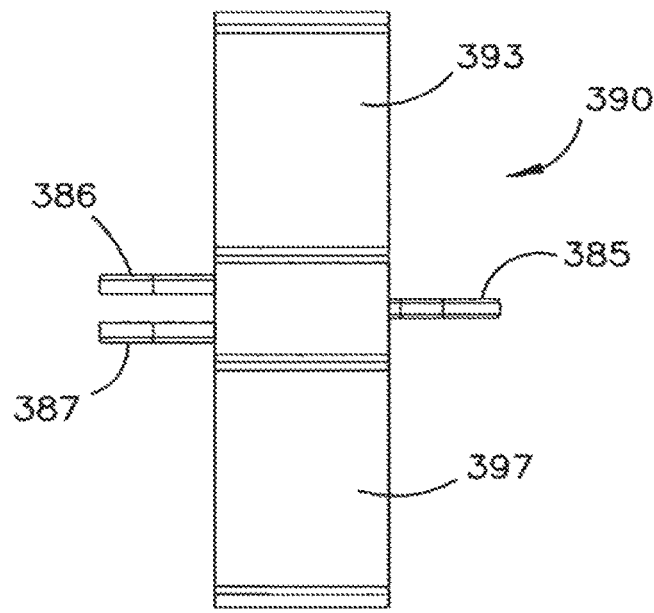
Figure 8:
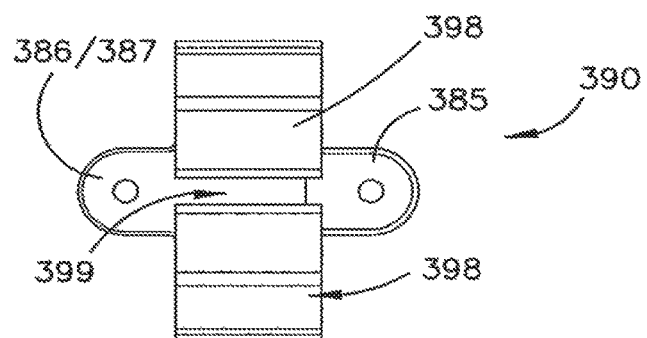

FIG. 6 shows a front view of one element in the articulator used in an embodiment of the present invention. The articulator as illustrated in FIGS. 4, 21A, 21B, 22A, 22B, 23A and 23B is made of a plurality of sections as illustrated in FIGS. 6, 7 and 8, joined end to end. This structure forms an elongate articulated connector that has a top channel and a bottom channel (corresponding to similarly positioned channels in the beam segments) in which cables can be retained. The articulator elements 390 are generally H-shaped in cross-section and define an upper channel 392 between two upstanding sides 393,394. Similarly, a bottom channel 395 is defined by downwardly depending arms 396 and 397. The top and bottom channels are partially closed by inwardly extending portions 398. The inwardly extending portions do not quite meet in the centre of the channel 392 but leave a gap 399 through which a cable may be inserted into the channel 392. Flanges 381 and 382 define a channel 383 for receiving a resilient strip when multiple elements are assembled into an elongated articulated connector. The bottom channel is of similar construction.

Figure 9:
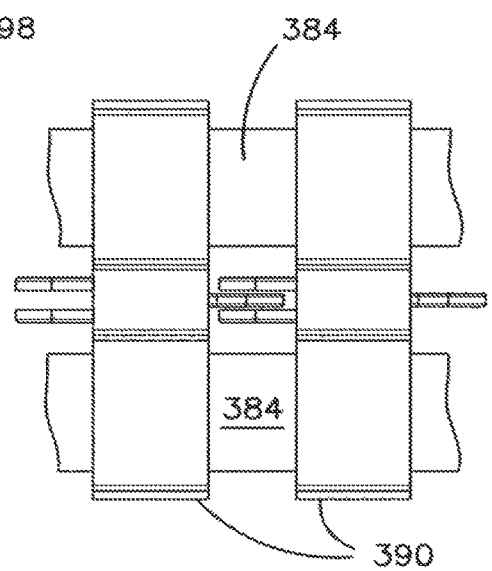
FIG. 9 illustrates two elements of a articulated connector joined together.
Figure 10:
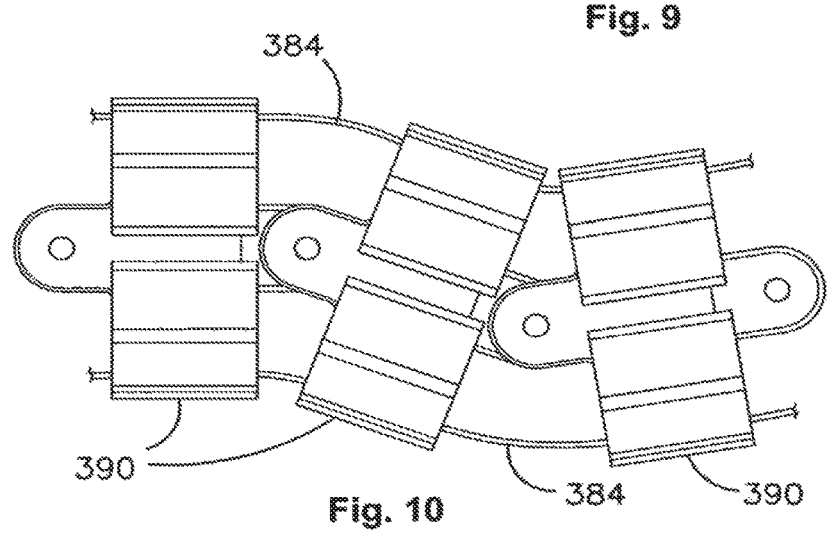
FIG. 10 illustrates a top view of a segment of articulated connector used in an embodiment of the present invention.

FIG. 7 illustrates a side view of the articulator element 390 that shows the connection flanges 385,386,387 used to link neighbouring elements in use. The forward flange 385 is adapted to be inserted into a gap between the rearward facing flanges 386,387 of the element mounted in front of it. FIG. 8 illustrates a top view of a single articulator element 390. FIG. 9 illustrates two such articulator elements 390 joined to each other in the manner described. FIG. 10 illustrates a top view of three articulator elements 390 to illustrate the articulated nature of the join between neighbouring elements 390. Neighbouring elements are connected through a hole in the flanges 385,386 and 387 with a pin to enable neighbouring articulator elements 390 to pivot with respect to each other. Flexible strips 384 are used to link neighbouring elements 390. Their shape means that the strips 384 allow bending in one plane but resist bending in a perpendicular plane. In use the articulator will be arranged to allow horizontal bending to route cables between beam segments while preventing drooping of the connector. This maintains the visual appearance of the beam through the curved joint, protects the cables, and also facilitates ease of repositioning and reconfiguration of the space and its use.

To better understand the flexibility provided by this type of beam connection FIGS. 21A to 23B illustrate in more detail, how two beam can be connected and reconfigured when they are joined by an articulator according to an embodiment of the present invention.

FIGS. 11 to 14 show detail of a hub leg 1200 used in one embodiment of the invention.

Figure 11:
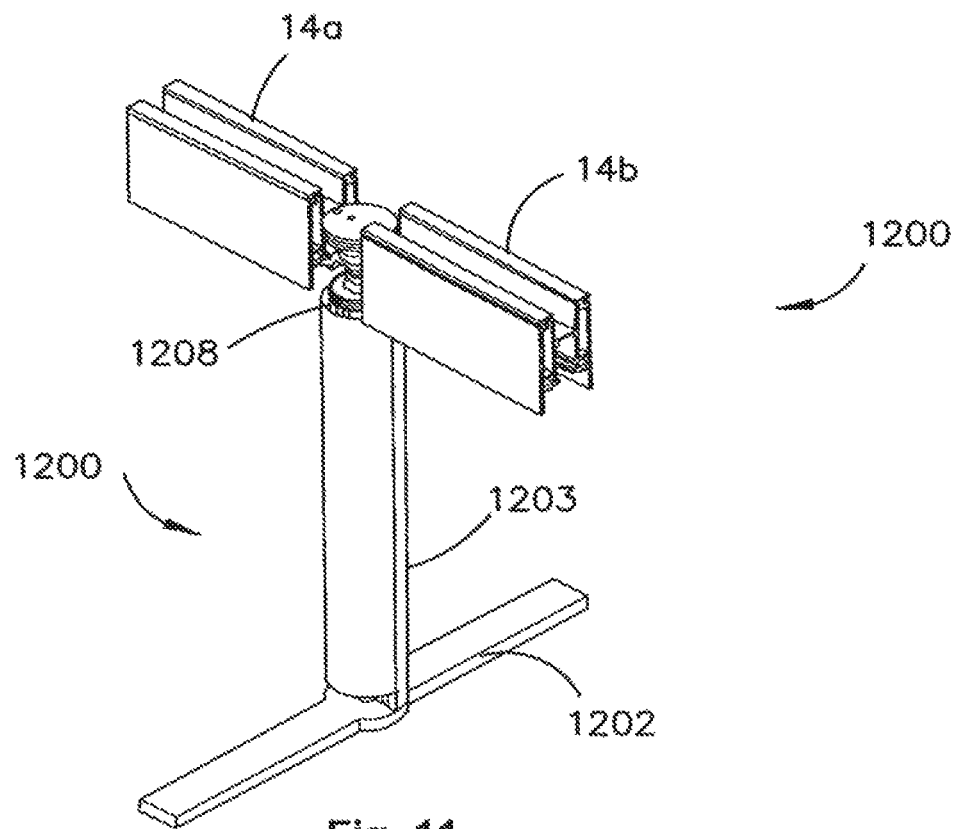
FIGS. 11 and 12 are a perspective view of a hub leg from two different sides according to an embodiment of the invention.

FIG. 11 illustrates a hub leg 1200 on which is mounted two beam segments 14a, 14b. This hub leg 1200 is adapted to support up to four such beam segments, however only two segments 14a, 14b are illustrated for clarity. The leg 1200 includes a base 1202 and an upright 1203.

Figure 12:
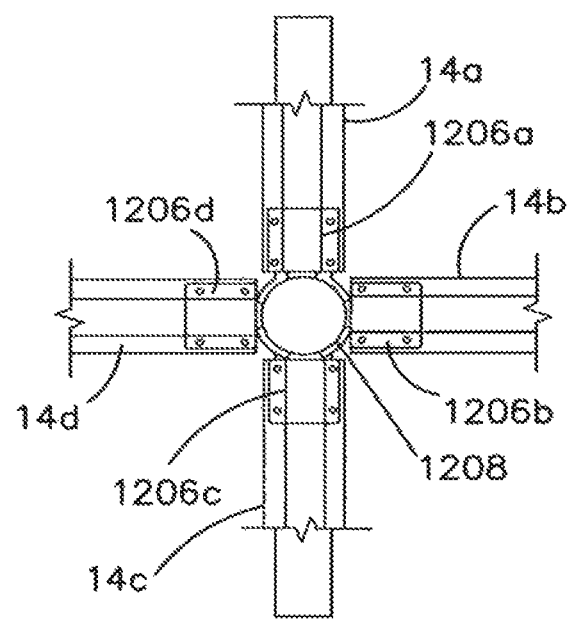

FIG. 12 shows a top view of a hub leg adapted to support four beams 14a, 14b, 14c, 14d. In this embodiment, the upright 1203 supports four beam mounting plates 1206a, 1206b, 1206c, 1206d. The beam mounting plates 1206a, 1206b, 1206c, 1206d are received into a correspondingly shaped channel formed in the beam segments 14a, 14b, 14c, 14d. The beam mounting plates 1206a, 1206b, 1206c, 1206d are shaped so as to leave a cable routing passage (or passages) 1208 to permit cables routed from the floor, through the hub leg 1200 to exit hub leg 1200 and enter a cable channel 26, 28 within the beam 14a,14b.

Figure 13:
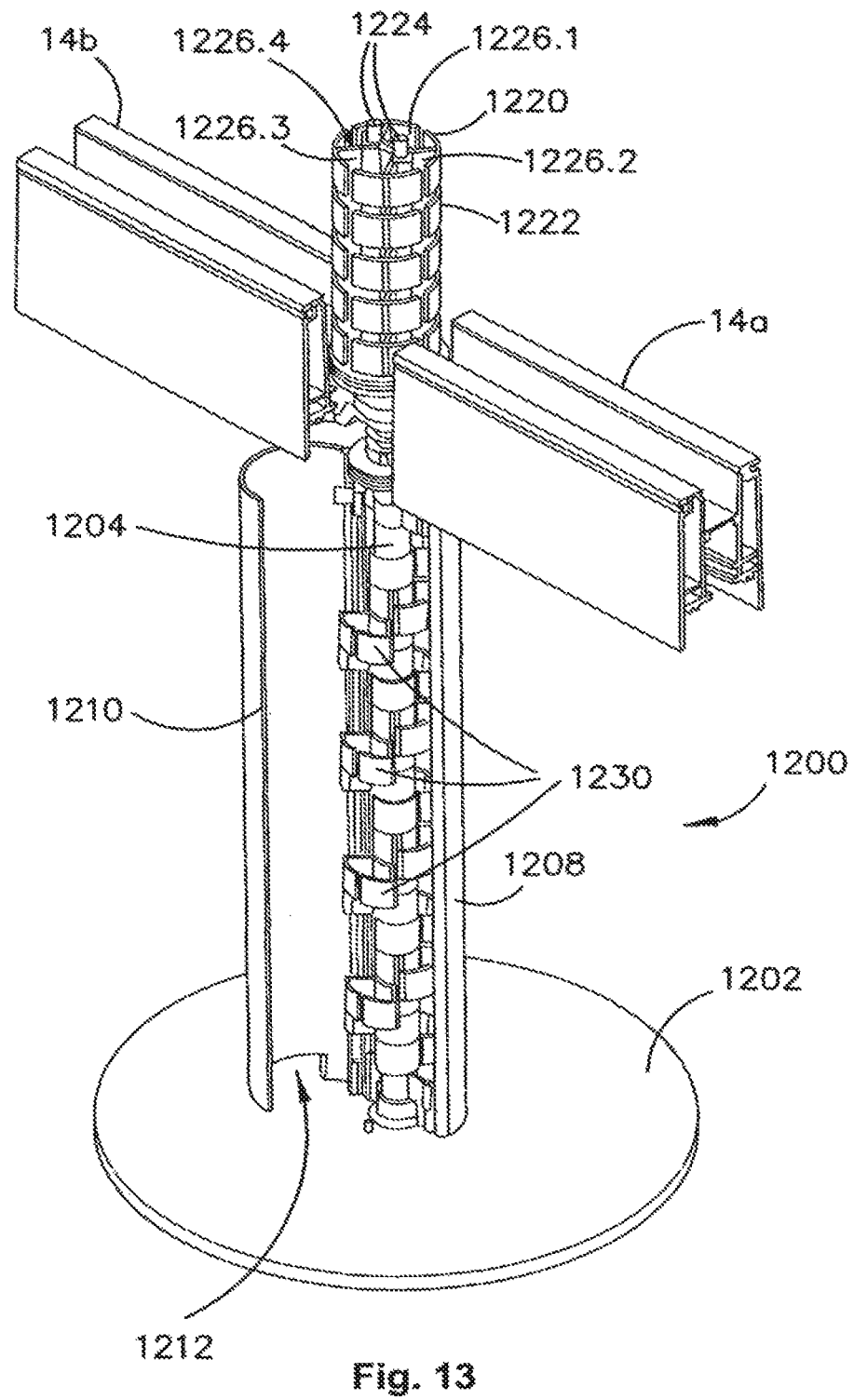
FIG. 13 illustrates a perspective view of a hub leg with its cover open to show the cable retaining structure housed therein.

FIG. 13 illustrates a hub leg 1200 with its cover open. In this figure, two channel sections 14a and 14b are mounted on the hub leg 1200. The hub leg 1200 includes a base 1202. The illustrated base 1202 is round, but other configurations including a straight-T leg base as illustrated in FIG. 11A are possible. An upright 1203 is mounted on the base 1202. A support column 1204 is positioned within the upright 1203. A plurality of cable retaining clips 1230 attached to the support column 1204 and may pivot around the support column 1204. The cable retaining clips 1230 have a collar at one end that fits around the support column 1204. The cable retaining clips 1230 have a pair of resilient jaws mounted to their collar. Cables can be routed from a floor duct up through the hub leg with the cables retained within the resilient jaws of the retaining clip. Typically a stack of clips will be mounted along the height of the support column 1204 as can be seen in FIG. 13. The cable retaining clips 1230 can be aligned so as define cable reticulation channels within the hub leg. In use when cables are retained in the cable retaining clips 1230 of a hub leg 1200 movement of one or more of the beam segments attached to the hub leg with respect to the other will cause the cables to attempt to rotate within the hub leg. Because the plurality of cable retaining clips 1230 are independently mounted on the support column 1204 of the leg 1200, each clip is able to rotate a different amount with respect to the support column 1204. In effect this allows the cable reticulation channel defined by a plurality of cable retaining clips 1230 through which a cable runs, to change shape to accommodate movement in the beam sections mounted to the hub leg. This configuration prevents sharp angular bends in the cables which would be caused if rigid vertical cable reticulation channels were used.

The cover of the hub leg is formed in two portions which are connected to each other by a hinge. Typically one of the cover portions is fixedly attached to the base. The movable cover portion 1210 is operable to enable cables to be inserted into the leg. The hinged cover portion has an access port 1212 formed into (or is shaped to provide access) to route cables into the retaining clips from a floor power or data output.

Figure 14:
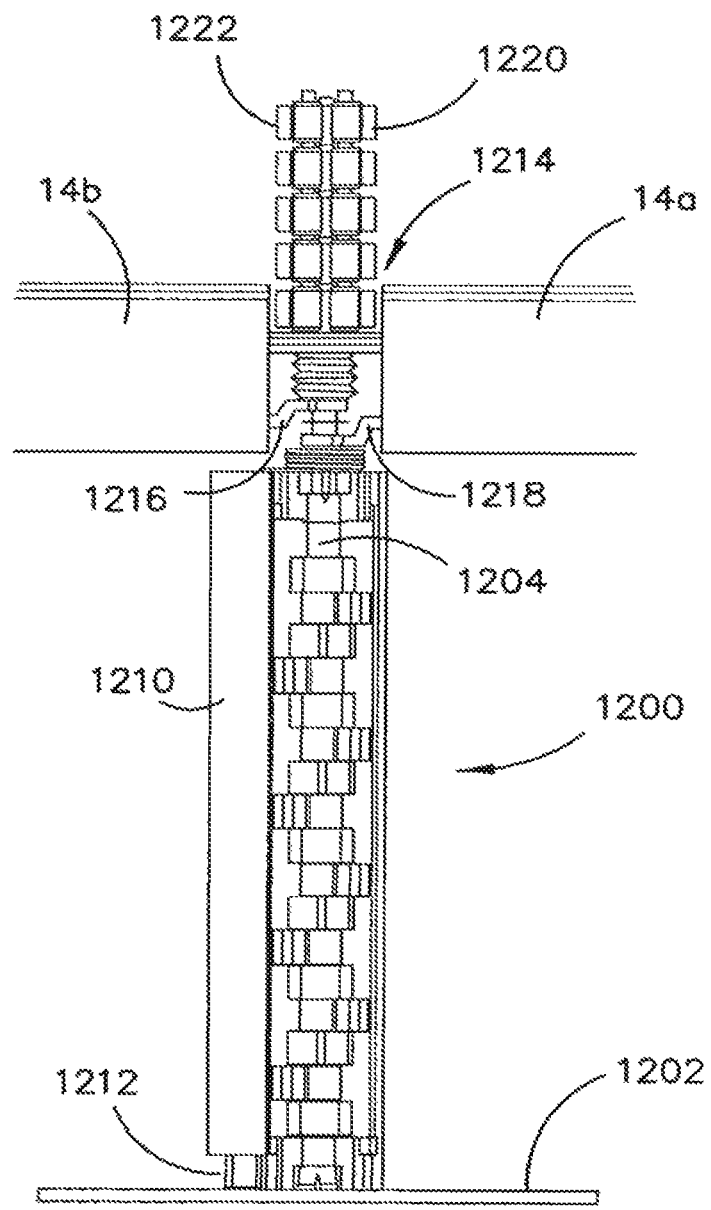
FIG. 14 illustrates a side view corresponding to FIG. 13.

FIG. 14 shows a side view of the same arrangement illustrated in FIG. 13. FIG. 14 more clearly shows the portion of the hub leg 1200 that connects the hub leg 1200 to the beam portions 14a and 14b. Attachment portion 1214 generally includes two mounting plates 1216 and 1218 which are received into slots (not shown) in the respective beam portions 14a and 14b. The mounting plates 1216 and 1218 are pivotally mounted on the support column 1204. In the embodiment of FIGS. 13 and 14 the system also includes an additional cable guiding system extending upwardly from the top of the hub leg 1200. The system is adapted to receive cables from above. The cable guiding system 1220 includes a plurality of plastic elements 1222 mounted on two retaining lines 1224. The clips 1222 each include four distinct channels formed therein 1226.1, 1226.2, 1226.3 and 1226.4, each having an access aperture. The provision of multiple channels allows separation of power and data cables and may avoid or reduce electrical interference between power and data cables.

Figure 15:
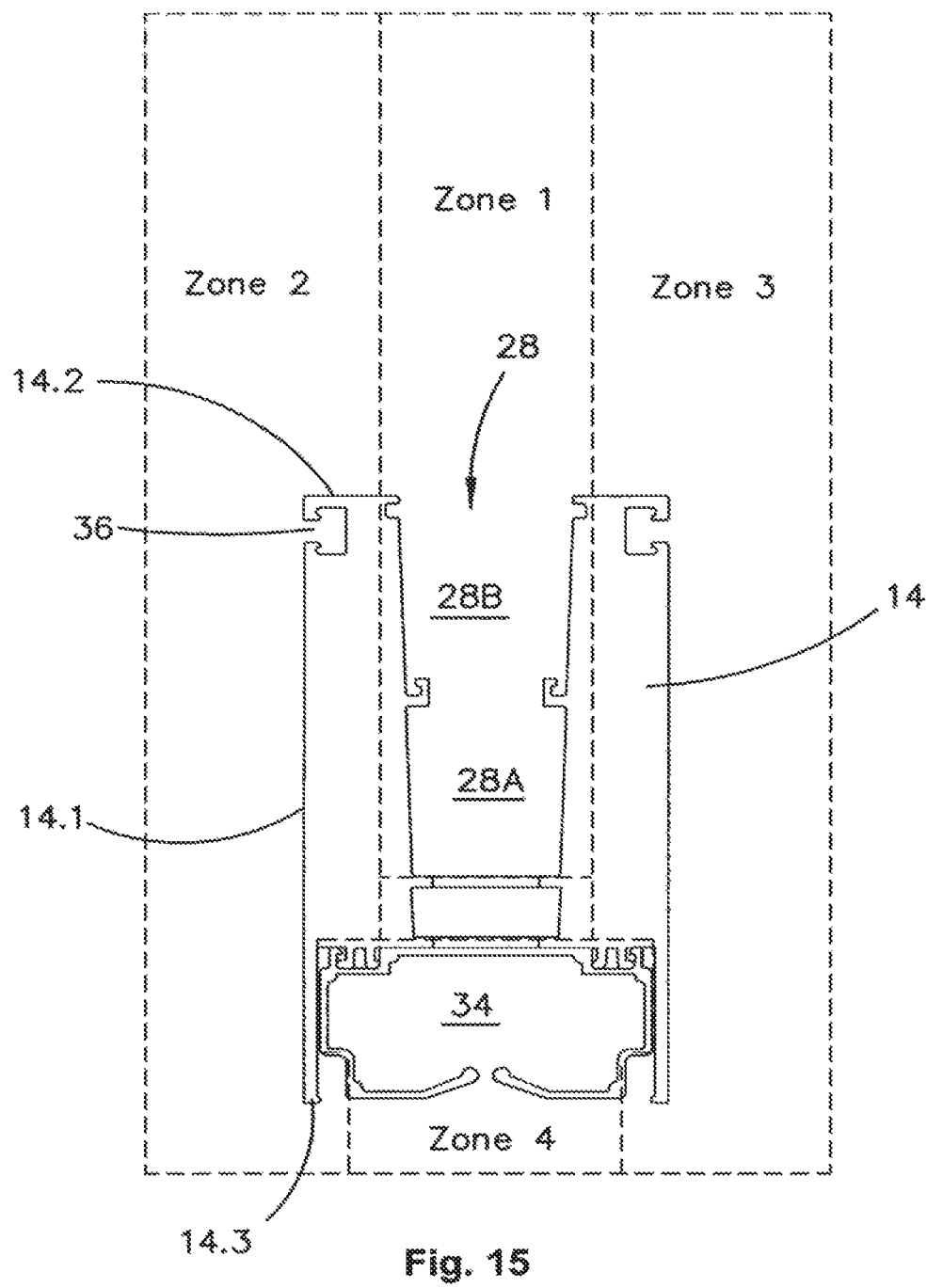
FIGS. 15 and 16 are cross-sectional views of a beam section used in an embodiment of the present invention.

FIG. 15 illustrates a cross-section of a beam member 14 usable in an embodiment of the present invention. The shape of the beam 14 is adapted to enable a plurality of accessories to be mounted on the beam 14 in such a way that they are user reconfigurable without using tools. In order to facilitate this, the beam 14 can be considered to notionally define four zones associated with it. These zones are labelled zone 1, zone 2, zone 3 and zone 4 and are defined to be separate regions in which accessories may be mounted. It is particularly advantageous that the zones are maintained separate from one another so that an accessory mounted in one zone does not overlap into another zone. In this way, accessories in each zone are able to be independently repositioned within the zone by a user without reconfiguring other accessories mounted in other zones.

Zone 1 is a top zone associated with the beam 14 and includes an upwardly opening channel 28. This channel is adapted to receive one or more accessories into the channel to be supported by the beam 14. The channel 28 has an inner channel segment 28a and an outer channel segment 28b. The inner channel 28a is adapted to receive cables, for example, data cables. The upper channel portion 28b is adapted to receive one or more accessories. A privacy screen, used to separate one workstation from another, may be an accessory mounted in upper channel part 28b. The privacy screen would typically include a panel inserted into the upper portion of the channel 28 and would be retained in that portion of the channel using a seal or similar device, for example, an insert panel fixing aperture (EPP Panel Fixing Extrusion).

Zones 2 and 3 side facing zones and are identical to each other but arranged in a mirror image on either side of the beam 14. It will be appreciated by a person skilled in the art that on a different beam, these zones or the beam features associated with the zones can be shaped differently to each other.

Figure 17:
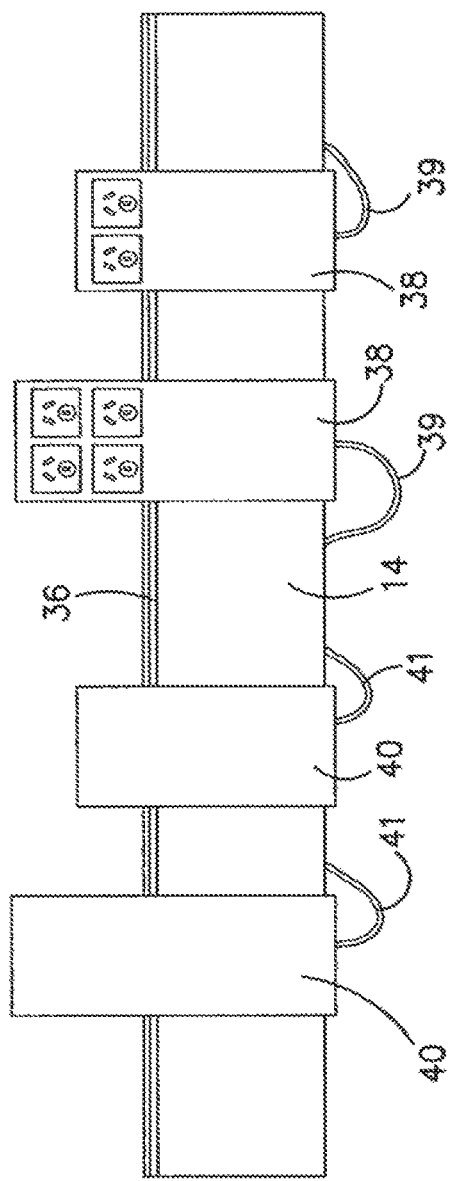
FIG. 17 is an illustration of two power board variants and two data board variants mounted on a beam segment according to an embodiment of the present invention.

Parts of the beam 14 are associated with each particular zone. In the case of zone 2 the side of the beam 14.1 its top surface 14.2, transom channel 36 and the inner edge of the flange 14.3 are associated with zone 2. Zone 2 is particularly adapted to receive accessories which are slidingly engaged in the transom 36 and supported on the side face 14.1, top face 14.2, or bottom face 14.3 of the beam 14. The inner edge of flange 14.3 is also associated with zone 2. Exemplary accessories attached in zone 2 are illustrated in FIG. 17, and include power and data boards, and in FIG. 18, which include monitor arms, shelving units and transom extensions. Other accessories may be associated with each zone.

Zone 4 is associated with the downwardly facing channel 34 located on the underside of the beam 14. This zone is typically used for the retention of cables, for example, power cables. However, it may be associated with other accessories. For example, cable catchers, cable trees, or downwardly descending modesty screens could be mounted in zone 4.

The zones described herein can extend outward from the zones defined by the dotted lines in FIG. 15 and in special cases may not have linear dividing lines between neighboring zones. In such cases definition of the zones is more complex but operates on the same principle: zones are defined in such a way as to prevent the repositioning of accessories in a first zone interfering with accessories in a neighboring zone. It may be appropriate to define a larger or smaller number of zones depending on the particular configuration of the beam 14. A zone will typically be associated with one or more mounting channels or other longitudinally extending mounting arrangements (e.g., flange(s), grooves, series of holes, series of pins, rails etc.) that may be used to engage or contain accessories mounted within that zone. In a preferred embodiment, the accessories can be attached and repositioned along the mounting arrangement without tools. This may be achieved, for example, by sliding an accessory mounted within a zone.

Figure 16:
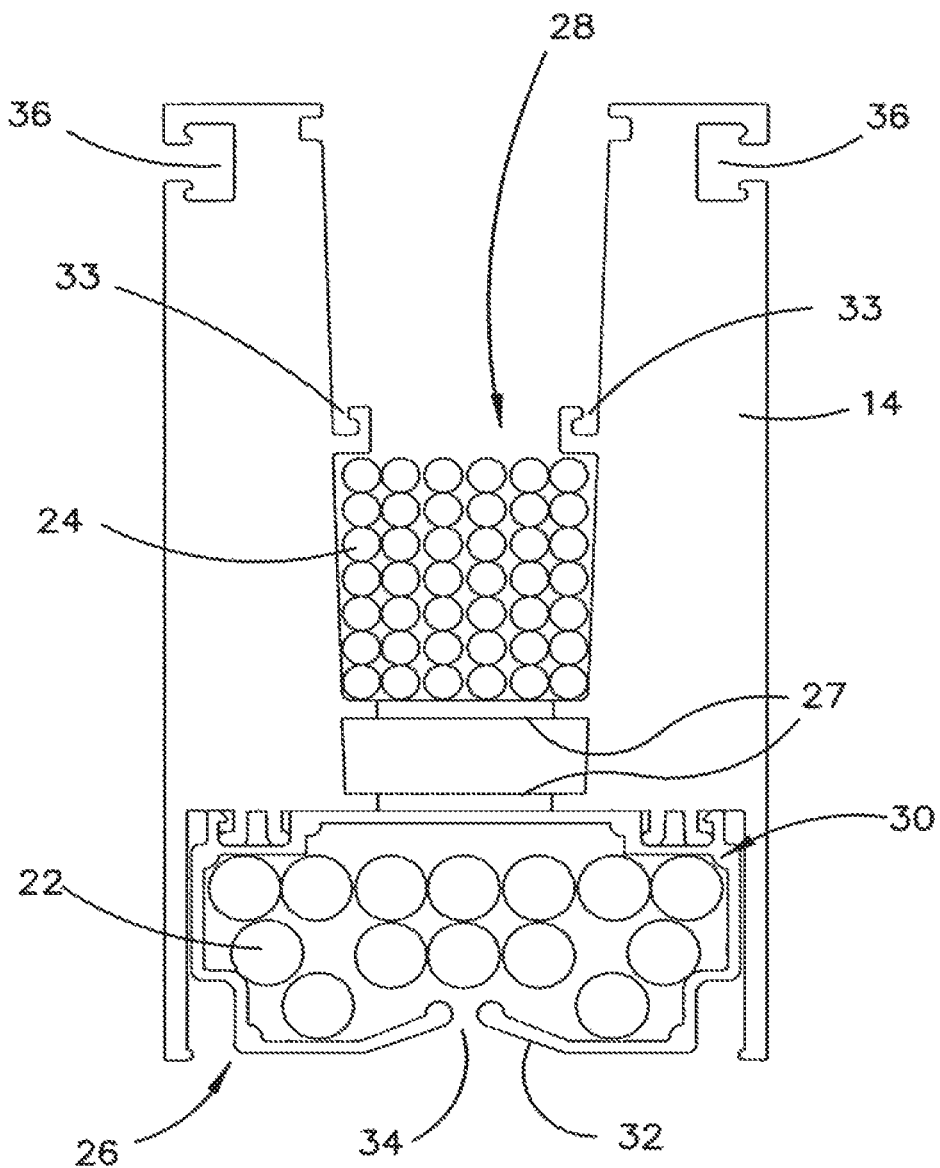

FIG. 16 shows a cross-sectional view of a beam segment of the preferred embodiment of the present invention, in which cables are held. The beam segment 14 is formed from a single extrusion of aluminum. However, in other embodiments, multiple extrusions could be joined together to form beam segment 14, or alternatively other manufacturing processes could be used. The beam 14 is capable of receiving power 22 and/or data cables 24 that are able to project out of the beam 14 at any position along the length of the beam. The beam structure includes two separate internal channels 26, 28 to house the power cables 22 separately from the data cables 24. The lower internal channel 26 includes a molding 30 that includes an insert that provides two flexible arms 32 that retain the data cables within the channel 26. The arms provide a gap 34 through which the power cables 22 and data cables 24 may project in use.

The floor of the top channel 28 and the roof of the lower channel 26 are intermittently broken by holes 27. The holes 27 are provided so that at certain points along the length of the beam a data cable can be routed out of the channel 28. The data cable is routed between the power cables 22 so that a free end of the cable can be connected to an appliance directly or to a data point. Similarly, power cables are routed out of the channel 26 through gap 34 at intervals to provide power to power boards mounted to the beam of the core 5.

The upper part of the channel 28 is separated from the lower part of the channel 28 by a pair of short ribs 33. These ribs 33 are adapted to engage a cover (not shown) which can be inserted into the channel 28 to cover the data cables 24 from above. The upper part of the channel 28 is adapted for mounting various accessories therein. In one embodiment, the upper part of the channel 28 is fitted with a rubber seal arrangement, for example, an insert panel fixing aperture (EPP Panel Fixing Extrusion). Privacy screens may be fitted into the rubber seal arrangement. The rubber seal arrangement is pressed into the upper part of the channel 28 and grips the lower part of the privacy screen.

The beam 14 includes an exterior channel 36 on at least one side, which is located near the top of the outer wall of the beam 16. The channel allows for the slidable mounting of interchangeable accessories along the length of the beam. Accessories may include power and/or data boards 38, 40, which are connected to the data 24 and/or power cables 22. A person skilled in the art would appreciate that channel 36 could be located at any height. Locating the channel 36 near the top allows accessories to be mounted from the channel above desk height. As can be seen from FIG. 17, the power and data boards can be of differing heights to allow for desired location in relation to the desk height.

One or more power points or data connection units may be mounted on each beam segment of the core. The power boards and data board are adapted to have a flange on their back face, which is adapted to engage with the slots 36 on the core.

FIG. 17 illustrates two embodiments of a power board according to an embodiment of the present invention and two embodiments of a data board. Power boards 38 can be provided with different dimensions and numbers of power sockets. In this example, two sizes of power board are illustrated; one having two power sockets and the other having four power sockets. The power boards are shaped such that the power sockets sit above the top of the core beam. Such a geometry will typically ensure that the power sockets are above the height of a desk usually associated with the core. Two sizes of data board 40 are illustrated. Each of the data boards 40 is provided with one or more data points accessible from the side of the board (not shown).

The power boards 38 are electrically connected to power cables 39, which connect via their bottom side. A loose length of cable is left to hang in a bight such that the power board is free to be slid along the beam 14 to the extent permitted by the length of the bight of cable. If a long travel is needed a large bight of cable can be left loose. This can be stored in a cable basket or cable catcher mounted from the beam if needed. Similarly, the data boards 40 are connected to data cables 41 which also enter into the cable reticulation system of the beam 14 via its underside. The power boards 38 and data boards 40 are slidable along the length of the core beam. The extent of permitted travel is limited only by the amount of free cable connected to the data board or power board.

Figure 18:
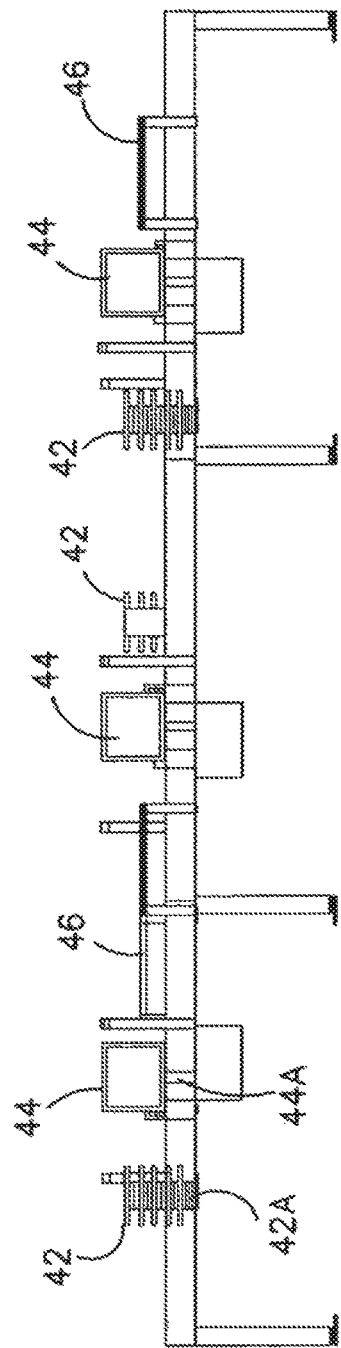
FIG. 18 illustrates an embodiment of a core arrangement on which various accessories are mounted.

The versatility of the present arrangement can be seen in FIG. 18, which shows a range of different accessories mounted to a core beam.

In this embodiment, the following accessories are mounted to the core beam 5:

a series of trays 42 mounted to the height adjustable tray mounting bracket 42a;

a monitor 44 mounted to the monitor arm 44a; a shelf 46 mounted to a rail via a pair of mounting brackets.

In each case, the accessories are adapted to engage the core beams in the same manner as the power and data boards 40, 38 described previously and are slidable along the length of the beam within their respective zones without interfering with accessories in other zones.

Figure 19A:
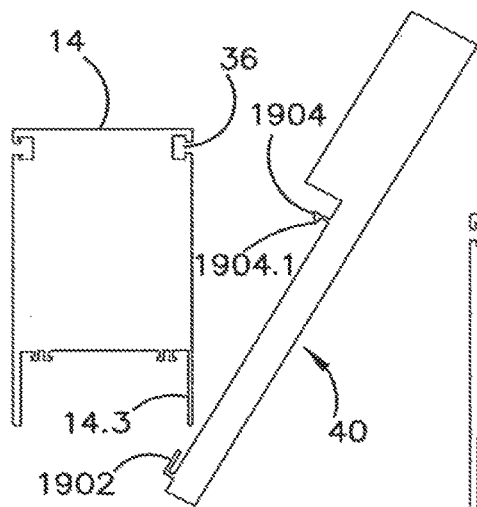
FIGS. 19A to 19D illustrate how an accessory can be mounted onto a central support beam in an embodiment of the present invention.
Figure 19B:
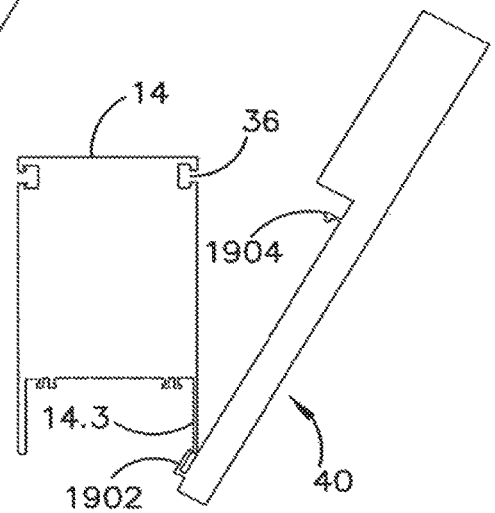
Figure 19C:
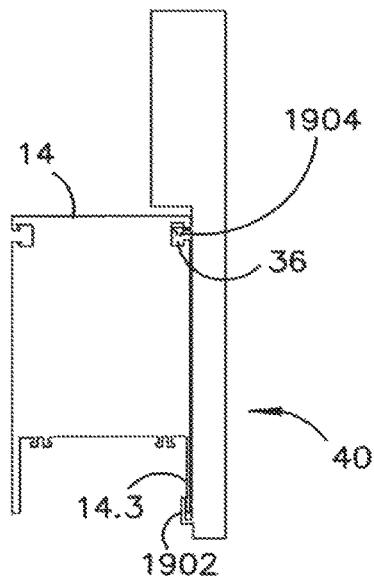
Figure 19D:
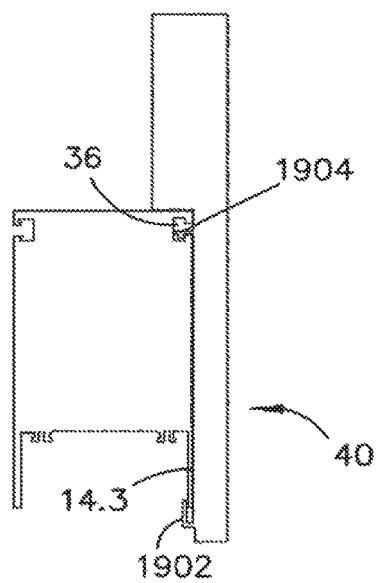

FIG. 19A shows a method by which an accessory (e.g., a power board in this example) can be mounted onto a support mean in an embodiment of the present invention. In a first step of the method a lower flange 1902 of the power board 40 is positioned such that the flange 1902 is adjacent the flange 14.3 of the beam 14. Next, in FIG. 19B the flange 1902 is hooked under the downwardly depending flange 14.3. Then, in FIG. 19C the board 40 is rotated towards so that the upper flange 1904 is inserted into the transom channel 36. The power board 40 is then dropped downwards so that the downwardly extending ridge 1904.1 locks into the correspondingly shaped groove in the transom channel 36 to stop the power board from falling off the beam 40. The power board 40 is preferably biased into the downwards position e.g., using a spring or other resilient member or material in the channel formed between the flange 1902 and the body of the power board 40 (an example of which is shown in FIG. 20). As will be appreciated other accessories can be mounted in a similar manner to that described in FIGS. 19A to 19D and removed in the reverse order of operation.

FIG. 20 illustrates an exemplary spring member that can be mounted on an accessory to assist in retaining it securely on a support beam 14. The biasing member 2000 is shaped and sized to fit within the channel 1902 of the power board 40. The member 2000 has a flat bottom with enlargements at each end. It has a void in its center to allow it to be flattened. The member is made from a resilient plastic, rubber or like material and spring back to shape when relieved of a deforming force. The member 2000 includes two upstanding flanges 2020 which are received into correspondingly shaped receiving apertures of the element in which it is mounted.

FIGS. 21A through 23B show two beam segments connected by an articulator, and illustrate the flexibility offered by use of an articulated connection of this type.

Figure 22A:
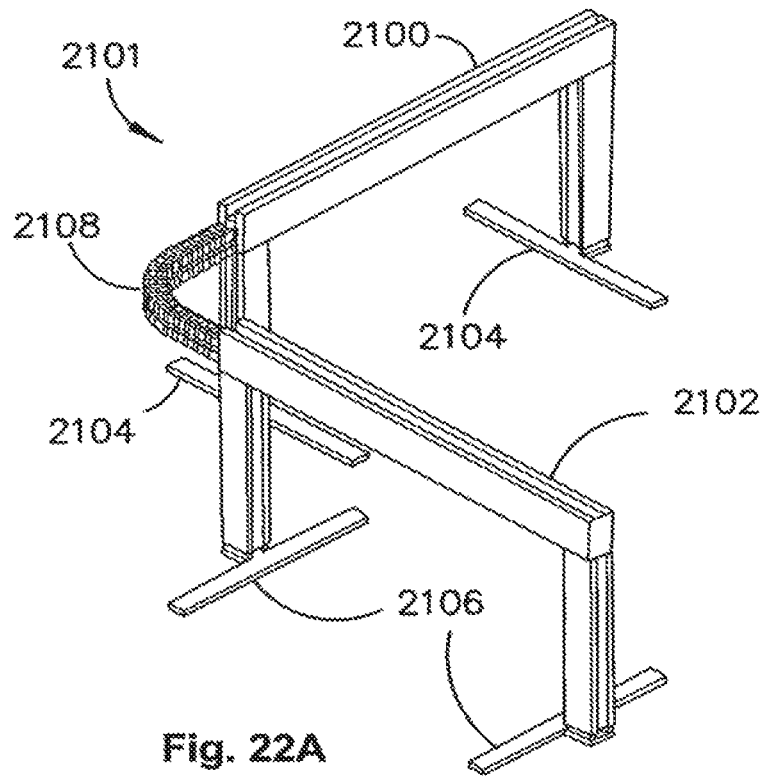
FIG. 22A illustrates a second exemplary configuration of two beam segments coupled by an articulated coupling.
Figure 22B:
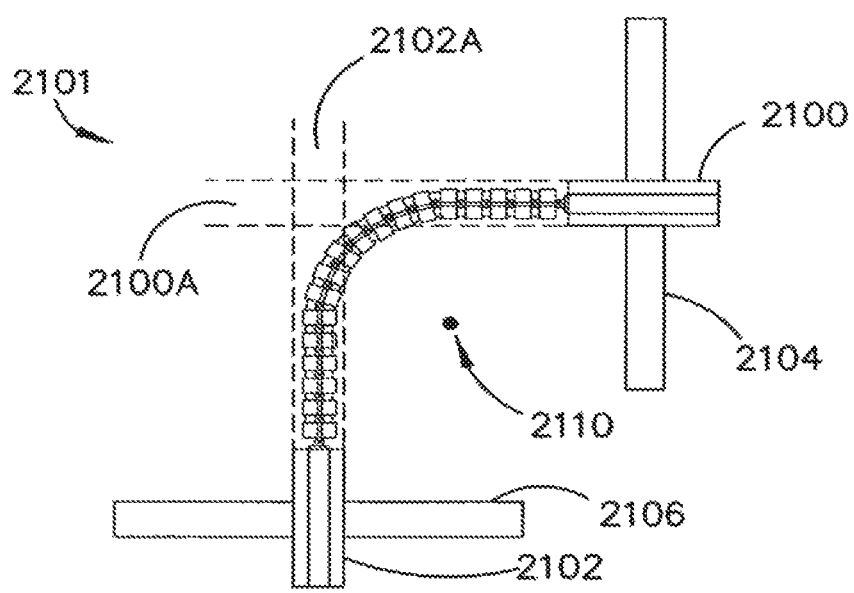
FIG. 22B illustrates the articulated coupling of FIG. 22A in more detail.
Figure 23A:
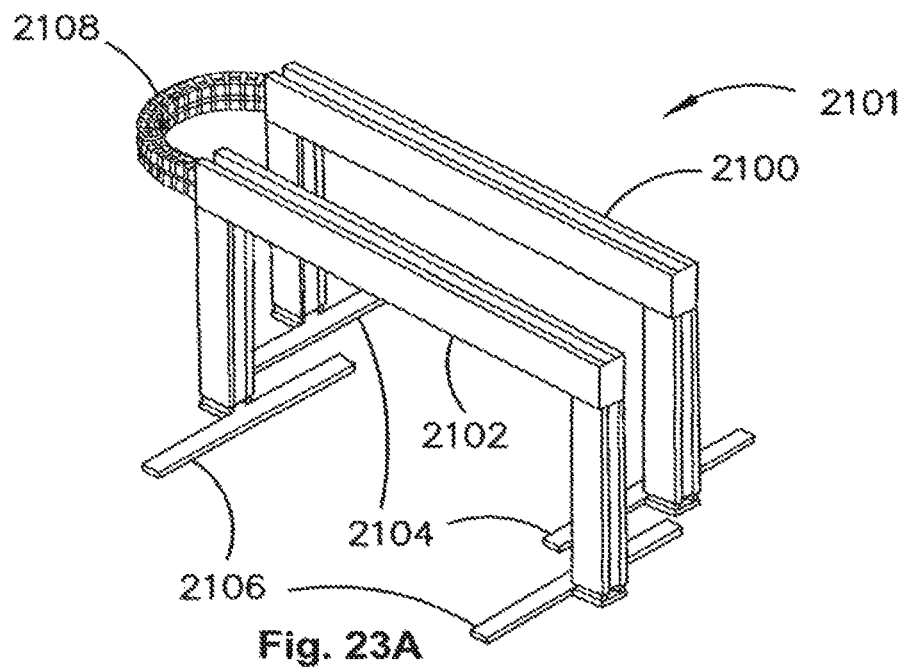
FIG. 23A illustrates a third exemplary configuration of two beam segments coupled by an articulated coupling.
Figure 23B:
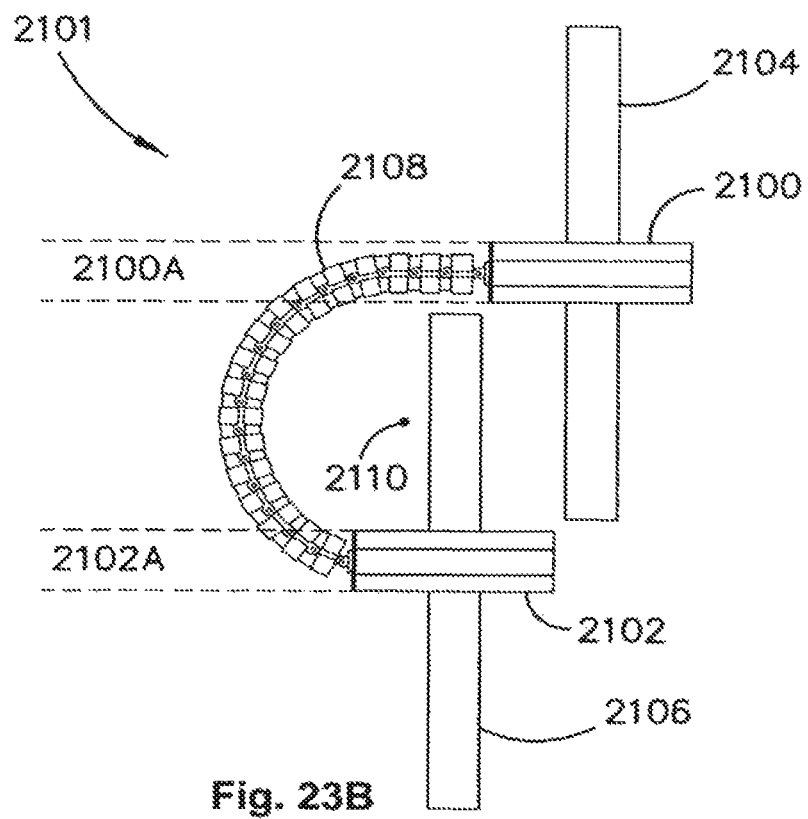
FIG. 23B illustrates the articulated coupling of FIG. 23A in more detail.

Turning firstly to FIGS. 21A and 21B, which show a core arrangement 2101 including two beam segments 2100 and 2102, each of which are supported on respective pairs of T legs 2104 and 2106. The beam segments 2100 and 2102 are connected to each other by an articulator 2108. As discussed above cables routed through the cable reticulation channels within the beam segments 2100 and 2102 can also be reticulated through the articulator 2108. The use of the articulator allows a user of the core structure 2101 illustrated to essentially infinitely vary the angle between the adjacent beam segments 2100 and 2102 from 00 offset between beam segments (i.e., the beam segments are aligned as illustrated in FIGS. 21A and 21B) to at least 1800 offset between neighboring beam segments (i.e., with the articulator 2108 bent back on itself so neighboring beam segments 2100, 2101 lie side by side as illustrated in FIGS. 23A and 23B). Moreover, having an articulator which is comprised of a multiplicity of small channel segments connected together by hinges approximates a smooth curve. Advantageously, the curve can have a radius of curvature which varies along the length of the articulator and is user selectable during configuration of the core. Moreover, the flexible nature of the articulator allows it to form curves where the center of curvature of the articulator (or, more correctly, one curve in the articulator) is variable. Moreover, the center of curvature of the articulator can lie outside the envelope defined by its adjacent beam segments and allows sweeping curves to be defined by the articulator. This arrangement can provide a particularly aesthetically pleasing appearance and allows the articulator to curve around and between objects placed adjacent to the core structure. This is in contrast to the use of a single hinge rigidly connected to the beam segments for joining neighboring beam segments, such as the hub leg described above. Turning now to FIGS. 22A and 22B, one can see that the beam segments 2100 and 2102 are offset from each other by approximately 900. As can be seen in this position, the centre of the curve defined by the articulator 2108, which is indicated by point 2110, lies outside the envelopes 2100A and 2102A (illustrated in dashed lines) which are defined by the respective beam segments 2100 and 2102. This type of curve in the articulator may be used to curve around another piece of furniture, such as a mobile table, a lamp, a sculptural element or a pot plant etc, placed at or near point 2110 without rendering a portion of the beams 2100 and 2102 relatively useless, which would be the case if these beam segments were connected to each other by a singly hinged connection.

FIGS. 23A and 23B illustrate the same beam segments 2100 and 2102 arranged in a side by side relationship with their articulator 2108 bent through substantially 1800. Thus, as can be seen in FIGS. 23A and 23B, a core arrangement with couplings between neighboring beam segments using the articulator can effectively be folded up or concertinaed back on itself. Moreover, using T legs such as that illustrated in FIGS. 23A and 23B enables a very close packing of the beam segments in this folder position. Although, as will be appreciated, in FIGS. 23A and 23B the beam segments 2100 and 2102 are set apart by the width of the T leg, this need not be the case and the beam segments may be placed in a touching, side by side relationship. In such an arrangement the articulator 2108 would effectively be bent around a loop.

The great flexibility illustrated in FIGS. 21A through 23B of connections formed by an articulator enable entirely new workplace arrangements to be facilitated, re-arranged or set up by people using the system without the need for auxiliary equipment such as tools and lifting equipment to make changes. For example, situations exist where rapid deployment of facilities or rapid re-arrangement of facilities may be required, e.g., conference facilities, multipurpose rooms in businesses, community or educational facilities, disaster recovery situations, etc. In such environments a core system (including two or more beam segments, as described herein and can be folded up when either not in use or when open space is required (as illustrated in FIGS. 23A and 23B) and unfolded when needed.

As will be appreciated, the flexibility of the present system allows any number of beam segments to be connected together. The beam segments can be connected in series using either one-to-one coupling means, e.g., the rigid or articulated coupling means described. Alternatively or parallel beam segment arrangements can also be deployed using a one to many coupling arrangement, such as the hub coupler described above, to provide branching capabilities. Moreover the extreme flexibility provided by the use of articulated coupling means allows curved, e.g., S-shaped or serpentine, core arrangements to be deployed.

Preferred embodiments of the present invention also provide an aesthetically pleasing work space as the system provides a clean, uncluttered look by concealing long cable runs whilst also allowing flexibility in the arrangement of facilities and minimal visual disruption when looking across a room. This end is achieved, in the preferred embodiment by only providing a beam rather than a partition in which cables are housed and on which accessories are mounted.

It will also be seen the present invention can allow better resource and material allocation than conventional workstation systems. For example, the lightweight nature of the core arrangement results in less material and resource usage than conventional partition or cubicle arrangements. The modular and user-reconfigurable nature of the system can also mean that materials are not used unless necessary, e.g., screening can be provided only in places where screening in necessary. Also, since the system of the preferred embodiment is highly reconfigurable and additions to it may be made at any time, a given system will be adaptable to changing circumstances for longer than conventional workstation systems, thus reducing the need to entirely re-fit a site. Finally, by allowing accessories to be added to a core structure over time, it is possible for a user, when adding new accessories, to select accessories that are made from up-to-the-minute materials which are less energy and resource intensive, rather than selecting only from a fixed range of accessories that are designed at the time of design of the underlying workstation system.

It will be understood that the invention disclosed and defined in this specification extends to all alternative combinations of two or more of the individual features mentioned or evident from the text or drawings. All of these different combinations constitute various alternative aspects of the invention.

While illustrative embodiments have been illustrated and described, it will be appreciated that various changes can be made therein without departing from the spirit and scope of the invention.

The embodiments of the invention in which an exclusive property or privilege is claimed are defined as follows:

1. A furniture leg adapted to support one or more furniture items in a reconfigurable manner, the leg including:
    at least one foot portion at a bottom of the leg to contact the ground,
    at least one furniture support member rotatable relative to the foot portion and configured to be coupled to furniture to be supported;
    load bearing support means extending between the foot portion and said at least one support member; and
    at least one cable retention member defining at least one cable channel within the leg wherein the at least one cable retention member is positioned between the at least one foot portion and the at least one furniture support member, and the at least one cable retention member is rotatable with respect to at least the foot portion and the furniture support member.

2. The furniture leg as claimed in claim 1, wherein the at least one cable retention member comprises a plurality of cable retention members that cooperate to define a cable channel within the leg.

3. The furniture leg as claimed in claim 1, wherein the support means includes a central support column on which each of the at least one cable retention members is mounted.

4. The furniture leg as claimed in claim 1, wherein each of the at least one cable retention members includes at least one pair of resilient cable retaining arms defining a cable retention channel, to releasably retain a cable.

5. The furniture leg as claimed in claim 3, wherein a plurality of cable retention members are mounted along the length of the support column to define at least one reconfigurable cable retention channel.

6. The furniture leg as claimed in claim 1, which further includes a cable access port to enable entry of cables into the cable channel.

7. The furniture leg in accordance with claim 1, wherein the furniture leg includes at least two furniture support members, said support furniture members comprising a respective mounting plate, the mounting plates being adapted to be received into slots in a beam section, wherein the beam section comprises a furniture item.

8. The furniture leg in accordance with claim 7, wherein the mounting plates are shaped so as to leave a cable routing passage or passages to permit cables routed from the floor, through the furniture leg to exit the furniture leg and enter a cable channel within the beam section.

9. The furniture leg in accordance with claim 7, wherein the load bearing support means is a support column and the mounting plates are pivotally mounted on the support column.

10. A workstation services support structure for an office environment, including:
    a plurality of furniture items capable of internally routing cables in a manner which allows at least one cable to be routed out of each furniture item at a plurality of positions along the length of the furniture item;
    wherein the furniture items are coupled to each other by coupling means, the coupling means enabling the relative angle formed between adjacent furniture items to be changed, the coupling means forming part of a leg assembly on which the furniture items are supported, wherein the leg assembly is a furniture leg in accordance with claim 1.

11. The workstation services support structure as claimed in claim 10, which further includes at least one exterior mounting channel on each furniture item for slideably receiving one or more interchangeable accessories, including at least one power or data board connected to respective cables routed through the furniture item, wherein each furniture item includes a plurality of routing paths to internally route cables, wherein the routing paths are defined by providing at least one routing channel through the furniture item.

12. The workstation services support structure as claimed in claim 10, wherein each furniture item includes an upper and lower cable routing channel.

13. The workstation services support structure as claimed in claim 12, wherein the upper cable routing channel is accessible via at least its upper side, and the lower cable routing channel is accessible via at least its underside.

14. The workstation services support structure as claimed in claim 10, wherein the coupling means couple more than two furniture items to form a branched beam arrangement.

15. The workstation services support structure as claimed in claim 10, wherein each furniture item is an elongate beam.

16. The workstation services support structure as claimed in claim 15, wherein each beam is supported at or near desk height.

\* \* \* \* \*

UNITED STATES PATENT AND TRADEMARK OFFICE
CERTIFICATE OF CORRECTION

PATENT NO. : 10,206,500 B2
APPLICATION NO. : 15/056887
DATED : February 19, 2019
INVENTOR(S) : P. P. Schiavello et al.

It is certified that error appears in the above-identified patent and that said Letters Patent is hereby corrected as shown below:

On the Title Page

Column 1 item [30], insert --2009903053 AU June 30, 2009--

In the Claims

Column 16 Line 18 Claim 7, delete "support furniture" and insert --furniture support--

Signed and Sealed this
Thirtieth Day of July, 2019

Andrei Iancu
*Director of the United States Patent and Trademark Office*